F. O. BOSWELL.
COMPOUND RAIL AND ELECTRICAL CONDUCTOR.
APPLICATION FILED SEPT. 30, 1919.

1,346,168.                                                Patented July 13, 1920.

Inventor
Fletcher O. Boswell
By W. W. Williamson
Atty.

UNITED STATES PATENT OFFICE.

FLETCHER O. BOSWELL, OF PHILADELPHIA, PENNSYLVANIA.

COMPOUND RAIL AND ELECTRICAL CONDUCTOR.

1,346,168.

Specification of Letters Patent.   Patented July 13, 1920.

Application filed September 30, 1919. Serial No. 327,371.

*To all whom it may concern:*

Be it known that I, FLETCHER O. BOSWELL, a citizen of the United States, residing at Philadelphia, in the county of Philadelphia and State of Pennsylvania, have invented new and useful Improvements in Compound Rails and Electrical Conductors, of which the following is a specification.

My invention relates to a new and useful improvement in compound rails and electrical conductors for surface and subway cars and the like, and has for its object to provide an exceedingly simple and effective device of this description, by which the tread of the rail may be removed and another substituted thereafter when it becomes worn, and the further object of my invention is to provide for the convenient housing of an electrical feed wire in the rail.

With these ends in view my invention consists in the details of construction and combination of elements hereinafter set forth, and then specifically designated by the claims.

In order that those skilled in the art to which this invention appertains may understand how to make and use the same, I will describe its construction in detail, referring by numerals to the accompanying drawing, forming a part of this specification, in which:—

Figure 1:
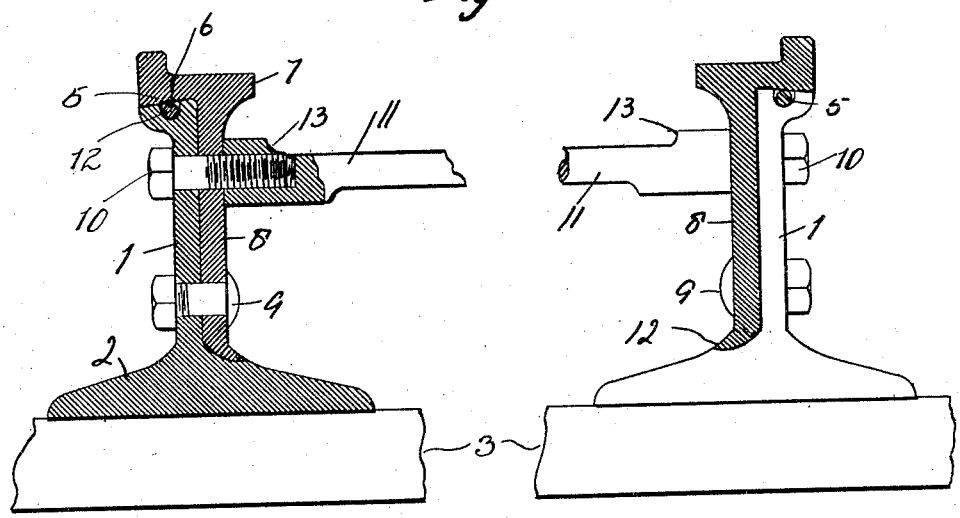
Figure 1 is an end view of a track including my improved rails therein, partly broken away and sectioned.
Figure 2:
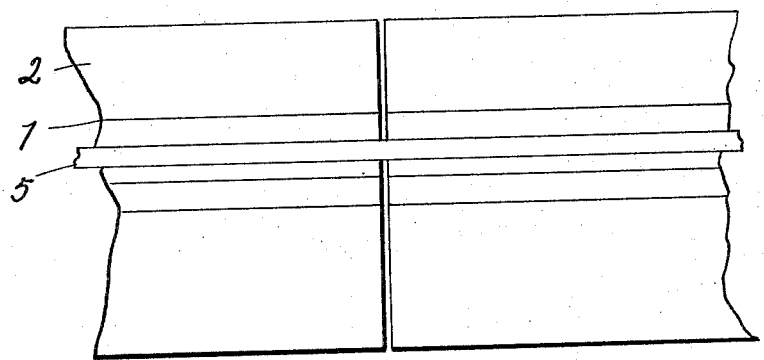
Fig. 2 is a plan view of a portion of two base rails showing the electrical conductor housed therein.

In carrying out my invention as here embodied, 1, represents the base of the rail having the usual flange 2, for securement to the cross ties 3 and upon the upper edge of the web of this base rail 1, is formed a head in which is a groove 5. In this groove 5 is housed the conductor wire 6 which may be insulated from the rail by any suitable material when the wire is to be used as a feed wire for carrying an electric current, or otherwise fused to the rail when it is to be used as a return or bond wire. 7 represents the tread which is superimposed on the head and completes the housing for the feed wire, and with this tread is formed a web 8, adapted to lie against the web of the base rail and be secured thereto by the bolts 9 and 10, the latter being of sufficient length to thread into one end of the spacing rod 11.

The upper face of the rail 1 is inclined as indicated at 12, while the underside of the tread 7 is correspondingly inclined, so that when the two rails are bolted together, any weight thereon will tend to draw the webs tighter against each other, thus relieving the bolts of undue strain.

From the foregoing description it will be seen that in constructing a track the base rails may be first placed in position and the tread thereafter secured thereon, the two rails of the track being properly spaced and held together by the rods 11. When the treads become worn they may be replaced by new treads, by simply removing the bolts 9 and 10, without disturbing the base rails, thus effecting great economy for repairs.

In elevated or subway tracks the wires 6 may be spot welded or otherwise fused to the rails and the spacing rods 11 insulated from the rails so that the current being fed through one of these wires will bridge across the wheels of the motor running in contact with the rails and thereby conveyed to the opposite rails, being carried off by the wire 5 therein.

When the track is for trolley service the wires will make a continuous connection between the rails, or, in cases where it is found desirable, one of the wires may be insulated and suitable connections made therewith for conveying the current to a trolley, the opposite wire serving as a return or grounding wire.

The ends of the spacing rods 11, wherein the bolts 10 are threaded, are partially cut away as indicated at 13 in order that the end threads of these bolts may be upset to lock said bolts against accidental displacement.

The meeting surfaces of the webs, head and tread may be coated to prevent rusting, or suitable material interposed therebetween for that purpose.

Of course I do not wish to be limited to the exact details of construction herein shown and described as these may be varied within the limits of the appended claims without departing from the spirit of my invention.

Having thus fully described my invention, what I claim as new and useful is:—

1. In a railway track, the combination of two part rails, one part superimposed upon the other, a housing formed in said rails, feed wires located in said housings and fused to the rails, and spacing rods for holding each line of rails in position relative to the other.

2. In a railway track, the combination of two part rails, spacing rods for holding each line of rails in position relative to the other, bolts for securing the rails together and to the spacing rods, said spacing rods having cut-away portions through which a portion of the threads of the bolts may be upset.

In testimony whereof, I have hereunto affixed my signature.

FLETCHER O. BOSWELL.